(12) United States Patent
Katefidis et al.

(10) Patent No.: US 10,780,382 B2
(45) Date of Patent: Sep. 22, 2020

(54) FILTER MODULE AND DEVICE FOR THE SEPARATION OF OVERSPRAY, AND PLANT HAVING THE SAME

(71) Applicant: EISENMANN SE, Böblingen (DE)

(72) Inventors: Apostolos Katefidis, Gärtringen (DE); Jürgen Röckle, Magstadt (DE)

(73) Assignee: EISENMANN SE, Boeblingen (DE)

( * ) Notice: Subject to any disclaimer, the term of this patent is extended or adjusted under 35 U.S.C. 154(b) by 0 days.

(21) Appl. No.: 16/177,557

(22) Filed: Nov. 1, 2018

(65) Prior Publication Data

US 2019/0134547 A1    May 9, 2019

Related U.S. Application Data

(62) Division of application No. 14/355,701, filed as application No. PCT/EP2012/004316 on Oct. 16, 2012, now abandoned.

(30) Foreign Application Priority Data

Nov. 3, 2011   (DE) .................. 10 2011 117 667

(51) Int. Cl.
*B01D 46/00*   (2006.01)
*B05B 14/43*   (2018.01)
(Continued)

(52) U.S. Cl.
CPC ......... *B01D 46/0019* (2013.01); *B01D 39/14* (2013.01); *B01D 45/08* (2013.01);
(Continued)

(58) Field of Classification Search
None
See application file for complete search history.

(56) References Cited

U.S. PATENT DOCUMENTS

| 1,339,112 A | * | 5/1920 | Kennedy | ................ | B01D 47/06 |
| | | | | | 261/111 |
| 1,628,932 A | * | 5/1927 | Traill | ..................... | F01M 13/04 |
| | | | | | 55/308 |

(Continued)

FOREIGN PATENT DOCUMENTS

| CN | 101 745 486 | 6/2010 |
| DE | 2 236 396 | 10/1973 |

(Continued)

OTHER PUBLICATIONS

"Between" definition, Merriam webster, Archived Mar. 14, 2016, Accessed Oct. 24, 2019, all pages https://web.archive.org/web/20160314131124/https://www.merriam-webster.com/dictionary/between (Year: 2016).*

*Primary Examiner* — Amber R Orlando
*Assistant Examiner* — Brit E. Anbacht
(74) *Attorney, Agent, or Firm* — Schroeder Intellectual Property Law Group, LLC

(57) ABSTRACT

A filter module for the separation of overspray from overspray-laden cabin air of coating plants, in particular of painting plants, having a filter housing which delimits a filter chamber through which overspray-laden cabin air can be conducted in a main flow direction. A plurality of separation elements composed of a separation material which is permeable to the cabin air is arranged in the filter chamber such that a flow labyrinth is formed between the separation elements. A separation device and a plant for coating articles having such a filter module is also provided.

6 Claims, 5 Drawing Sheets

(51) Int. Cl.
*B01D 45/08* (2006.01)
*B01D 46/12* (2006.01)
*B01D 39/14* (2006.01)

(52) U.S. Cl.
CPC ....... *B01D 46/002* (2013.01); *B01D 46/0023* (2013.01); *B01D 46/12* (2013.01); *B01D 46/125* (2013.01); *B05B 14/43* (2018.02); *B01D 2273/10* (2013.01)

(56) References Cited

U.S. PATENT DOCUMENTS

| | | | | |
|---|---|---|---|---|
| 1,716,479 A * | 6/1929 | Billings | ........... | B01D 53/62 131/207 |
| 1,769,071 A * | 7/1930 | Raney | ........... | F02M 35/024 261/104 |
| 1,946,744 A | 5/1931 | Jones et al. | | |
| 2,057,579 A * | 10/1936 | Franz | ........... | F24F 3/16 261/111 |
| 2,395,960 A * | 3/1946 | Clark | ........... | B01D 47/06 96/358 |
| 2,585,440 A * | 2/1952 | Collins | ........... | B01D 47/06 159/4.01 |
| 2,767,806 A * | 10/1956 | Blake | ........... | B01D 45/10 261/111 |
| 2,896,743 A * | 7/1959 | Bradshaw | ........... | B01D 45/08 181/270 |
| 3,481,115 A * | 12/1969 | Brandt | ........... | B01D 47/021 261/122.1 |
| 3,556,734 A * | 1/1971 | Peterson | ........... | B01D 47/06 181/261 |
| 3,624,696 A * | 11/1971 | Cohen | ........... | B01D 47/024 261/118 |
| 3,738,627 A * | 6/1973 | Scotchmur | ........... | B01D 45/08 261/119.1 |
| 3,811,252 A * | 5/1974 | Evans | ........... | B01D 45/08 261/109 |
| 3,877,909 A * | 4/1975 | Hansen | ........... | B01D 46/10 55/487 |
| 3,888,642 A * | 6/1975 | Toyama | ........... | B01D 50/00 261/100 |
| 3,955,945 A * | 5/1976 | Bauer | ........... | F04B 39/16 55/319 |
| 4,359,329 A * | 11/1982 | Willeitner | ........... | B01D 50/002 210/DIG. 5 |
| 4,378,728 A * | 4/1983 | Berkmann | ........... | B05B 14/48 454/53 |
| 4,401,445 A | 4/1983 | Browning | | |
| 4,437,867 A * | 3/1984 | Lerner | ........... | B01D 46/12 55/308 |
| 4,484,513 A * | 11/1984 | Napadow | ........... | B01D 45/10 454/55 |
| 4,874,412 A * | 10/1989 | Nowack | ........... | B01D 45/08 55/385.1 |
| 4,895,083 A * | 1/1990 | McDilda | ........... | B01D 45/08 110/216 |
| 5,107,756 A * | 4/1992 | Diaz | ........... | B05B 14/48 454/53 |
| 5,153,034 A * | 10/1992 | Telchuk | ........... | B05B 16/60 427/424 |
| 5,741,178 A * | 4/1998 | Telchuk | ........... | B01D 47/06 454/54 |
| 6,010,554 A * | 1/2000 | Birmingham | ........... | B01D 45/08 55/444 |
| 6,264,745 B1* | 7/2001 | Diaz | ........... | B05B 14/45 118/326 |
| 7,309,369 B2 | 12/2007 | Eder | | |
| 9,321,070 B2* | 4/2016 | Link | ........... | B05B 14/43 |
| 9,643,118 B2 | 5/2017 | Wieland et al. | | |
| 10,272,462 B2 | 4/2019 | Link et al. | | |
| 2005/0011173 A1 | 1/2005 | Hornfeck et al. | | |
| 2005/0229560 A1 | 10/2005 | Eder | | |
| 2007/0022966 A1* | 2/2007 | Torring | ........... | A01K 63/02 119/201 |
| 2008/0110339 A1* | 5/2008 | Kwok | ........... | B01D 45/08 95/31 |
| 2008/0314248 A1 | 12/2008 | Peteln | | |
| 2009/0209188 A1 | 8/2009 | Wieland et al. | | |
| 2010/0050870 A1* | 3/2010 | Gajjar | ........... | B01D 39/1623 95/273 |
| 2014/0366798 A1* | 12/2014 | Katefidis | ........... | B05B 14/43 118/326 |
| 2015/0367372 A1* | 12/2015 | Roeckle | ........... | B01D 46/0002 55/495 |
| 2016/0023231 A1* | 1/2016 | Schmeinck | ........... | B01D 45/12 95/273 |
| 2016/0326728 A1* | 11/2016 | Foote | ........... | E03B 11/02 |
| 2017/0209891 A1 | 7/2017 | Wieldand et al. | | |
| 2019/0247878 A1* | 8/2019 | Rockle | ........... | B05B 14/43 |
| 2020/0047097 A1* | 2/2020 | Knaus | ........... | B01D 45/10 |

FOREIGN PATENT DOCUMENTS

| | | |
|---|---|---|
| DE | 201 09 800 | 8/2001 |
| DE | 10 2008 021 225 | 10/2009 |
| EP | 0 082 106 | 6/1983 |
| EP | 1 080 788 | 7/2001 |
| JP | 2002-031180 | 1/2002 |
| WO | 03/084638 | 10/2003 |

* cited by examiner

FILTER MODULE AND DEVICE FOR THE SEPARATION OF OVERSPRAY, AND PLANT HAVING THE SAME

RELATED APPLICATIONS

This application is a divisional application of U.S. patent application Ser. No. 14/355,701 filed on May 1, 2014 which is a national phase of International Patent Application No. PCT/EP2012/004316 filed Oct. 16, 2012, which claims the filing benefit of German Patent Application No. 10 2011 117 667.9, filed Nov. 3, 2011—the contents of all of which are incorporated herein by reference.

FIELD OF THE INVENTION

The invention relates to a filter module for the separation of overspray from the overspray-laden booth air of coating plants, in particular of painting plants, having a filter housing which delimits a filter space through which overspray-laden booth air can be conducted in a main flow direction.

The invention also relates to a device for the separation of overspray from the overspray-laden booth air of coating plants, in particular of painting plants, having at least one filter module through which overspray-laden booth air can be conducted and in which overspray is deposited.

Furthermore, the invention is concerned with a plant for coating, in particular painting articles, in particular vehicle bodies, having
a) a coating booth, in which coating material can be applied to the articles and through which can be conducted an air flow which takes up and carries off resulting overspray of the coating material;
b) a separation device, to which this booth air can be supplied and where a large part of at least the solids is separated from the overspray.

BACKGROUND OF THE INVENTION

During the manual or automatic application of paints to articles, a partial flow of the paint, which generally contains both solids and/or binders as well as solvents, is not applied to the article. This partial flow is called "overspray" in the industry. Furthermore, the terms overspray, overspray particles or overspray solids are always understood in the sense of a disperse system, such as an emulsion or suspension or a combination thereof. The overspray is picked up by the air flow in the painting booth and passed on for separation, so that the air can be led back into the coating booth again, optionally after a suitable conditioning.

Particularly in plants with a larger paint consumption, for example in plants for painting vehicle bodies, wet separation systems are preferably employed.

As an alternative to wet separation, filter modules and separation devices of the kind mentioned at the outset, by means of which dry separation is carried out, are known from the market. In turn, particularly electrostatically operating separators have become established, in which the paint overspray is led past a separation surface and deposited there by the overspray particles being ionised by an electrode device and migrating to the separation surface owing to the electric field created between the separation surface and the electrode device. The paint overspray particles adhering to the separation surface can then be, for example, mechanically stripped from this surface and carried away.

The cleaning action of such separators is indeed very high. However, for continuous operation, it must always be ensured that a sufficiently strong electric field can form between the separation surface and the electrode device, which is possible only up to a certain layer thickness of paint overspray on the separation surface, since such a layer has an insulating effect. The continuous removal of the paint overspray from the separation surface may, however, involve measures which are structurally quite expensive. Moreover, it may happen that overspray on the separation surface reacts, hardens or dries in such a manner that this overspray can no longer be removed by simple stripping from the separation surface. In addition, the expenditure of energy justified by the high separation effect cannot be ignored in such separators.

As an alternative to the electrostatic separators, dry separators for overspray have also become established on the market. For example, there are nonwoven filters in which the overspray-laden booth air flows through a nonwoven material on which the overspray is deposited. However, the surface of such nonwoven filters becomes clogged quickly and irreversibly, in particular in the case of adherent particles which are present in paint overspray, so that a pressure drop in the flowing air results and sufficient separation is no longer ensured. Such nonwoven filters can also be formed as sintered lamellar filters and additionally coated with, for example, a rock meal; this layer serves as a protective layer for the actual filter material and can then be periodically cleaned off. In some cases, however, very large amounts of rock meal or generally of layer material are required for this purpose.

A further example of dry separators are so-called inertial filters, in which the air flowing through a filter undergoes as many changes of direction as possible, during which the paint particles owing to their inertia collide with surfaces against which the air flows and adhere thereto. Small and thus light paint particles remain in the air flow, however, so that the separation effect of such inertial filters is limited.

SUMMARY OF THE INVENTION

An object of the present invention is therefore to provide a filter module, a separation device and a plant of the kind mentioned at the outset, which take account of these problems.

This object may be achieved with a filter module of the kind mentioned at the outset in that a multiplicity of separation elements composed of a separation material which is permeable to the booth air are arranged in the filter space such that a flow labyrinth is formed between the separation elements.

The invention is based on the realisation that in this way the absorption amount of a filter module can be reached with a good separation efficiency, since the filter module firstly works as a classic separation filter, but can act according to the principle of an inertial filter when the separation elements are blocked by overspray. The main flow direction defines in this filter the direction in which the booth air passes through the filter module, but then no longer describes the flow path of the booth air through the flow labyrinth. This is explained further hereinbelow.

In practice, filter lamellae, filter sleeves, compartmented structures or chambered structures have proved favourable as separation elements.

In the case of filter lamellae, good separation results can be achieved when these filter lamellae are formed in the form of separation mats.

Alternatively, the filter lamellae can be formed with a V-shaped or arcuate cross-section.

The separation effect in the function of the classic separation filter is particularly good when the separation material is a fibre material. Preferably, the separation material is a nonwoven material.

The filter module works particularly effectively when the separation elements are arranged in filter stages which follow one another in the main flow direction.

When the material density of the separation elements in the filter stages increases in the main flow direction, it is ensured that even extremely fine particles are also separated from the booth air with the subsequent filter stages.

With regard to a separation device of the kind mentioned at the outset, the above-specified object may be achieved in that at least one filter module is a filter module having some or all of the features explained above.

In the case of the coating plant of the kind mentioned at the outset, the above-specified object may be achieved in that this separation device is present.

The advantages in the case of the separation device and the coating plant correspond to the advantages explained above with respect to the filter module.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Exemplary embodiments of the invention are explained in more detail below with reference to the drawings, in which.

DETAILED DESCRIPTION OF THE PRESENT INVENTION

Figure 1:
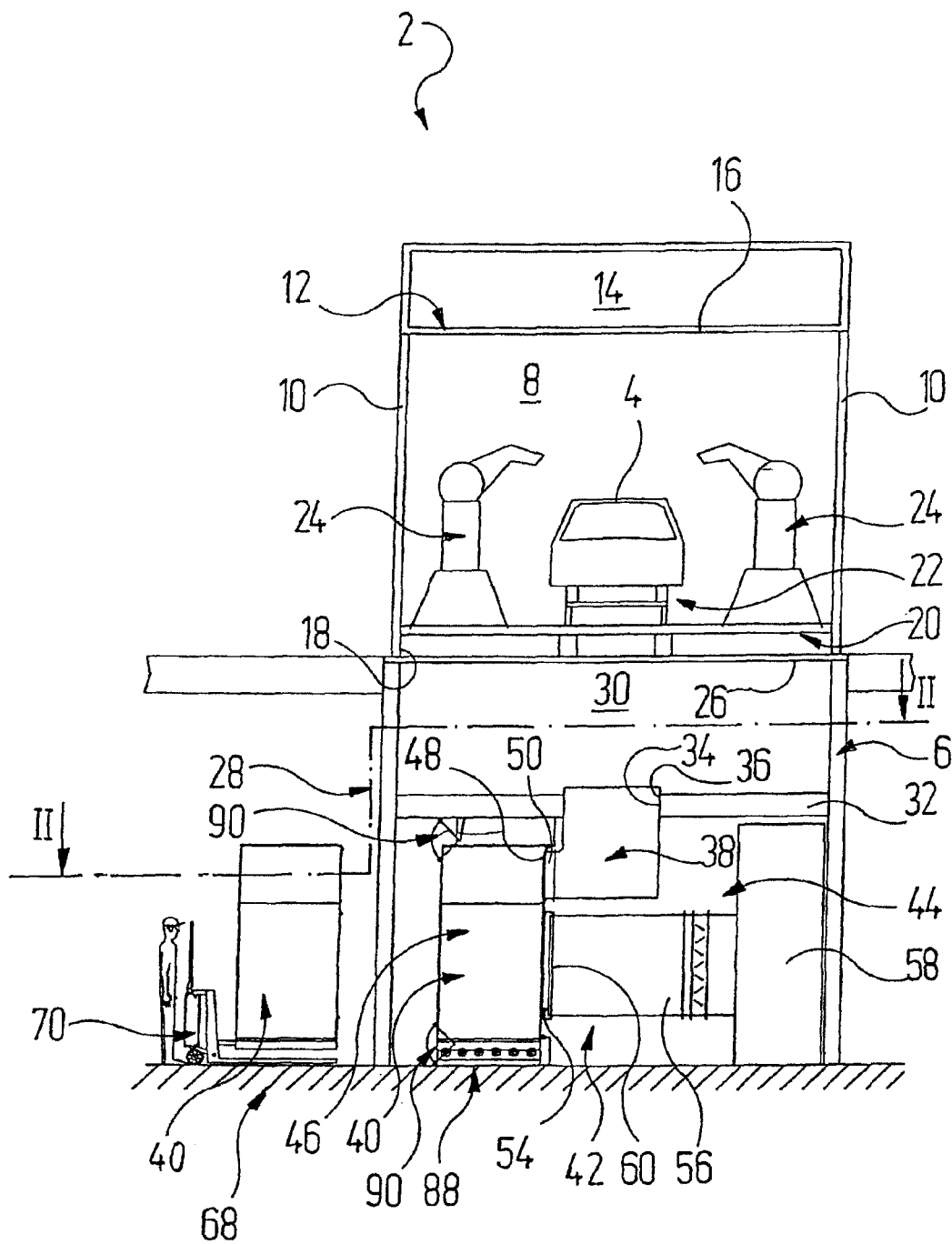
FIG. 1 shows a painting booth of a surface treatment plant having a separation device for overspray in a front view.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

In FIG. 1, numeral 2 designates as a whole a painting booth of a surface treatment plant, in which vehicle bodies 4 are painted after they have been, for example, cleaned and degreased in pretreatment stations (not shown specifically) upstream of the painting booth 2. The painting booth 2 rests on a steel structure 6, as is known per se.

The painting booth 2 comprises a painting tunnel 8 which is arranged at the top and which is delimited by vertical side walls 10 and a horizontal booth ceiling 12, but is open at the ends. Furthermore, the painting tunnel 8 is open downwards in a manner such that overspray-laden booth exhaust air can flow downwards. The booth ceiling 12 is formed in customary fashion as a lower delimitation of an air supply space 14 with filter ceiling 16.

Arranged above a lower opening 18 of the painting tunnel 8 is a steel frame 20 which supports a conveying system 22, not discussed in more detail here. With this, vehicle bodies 4 to be painted can be transported from the entrance side of the painting tunnel 8 to its exit side. Situated in the inside of the painting tunnel 8 are application devices in the form of multi-axis application robots 24, as known per se. The vehicle bodies 4 can be coated with paint by means of the application robots 24.

The lower opening 18 of the painting tunnel 8 is covered by a walk-on grating 26. Situated below the grating 26 is a plant region 28 in which the overspray particles carried along by the booth air are separated from the booth air.

Thus, air flows from the air supply space 14 downwards through the painting tunnel 8 to the plant region 28, the air taking up and carrying along with it paint overspray present in the painting tunnel 8.

The plant region 28 comprises a flow region 30, into which the overspray-laden booth air flows firstly and which, for this purpose, is open upwards towards the painting booth 2, but delimited to the side by the side walls 10 and downwards by an intermediate ceiling 32. The intermediate ceiling 32 has in the booth longitudinal direction a plurality of passages 34 arranged one behind the other. Each of these passages 34 leads to a duct inlet 36 of a respective air guiding duct 38, into which the booth air laden with overspray particles flows firstly, overall, vertically downwards.

The air guiding duct 38 then diverts the booth air by 90° into the horizontal, whereupon this air then flows, overall, in a horizontal direction into a filter module 40. Each filter module 40 forms a separation unit, with which cooperates a separation device designated as a whole by 42, which is present in a separation region 44 of the painting booth 2 and arranged below the flow region 30.

Each filter module 40 is detachably connected to one of the air guiding ducts 38. For this purpose, each filter module 40 has a filter housing 46 with a filter inlet 48 which is formed in a manner complementary to a duct outlet connection piece 50 of the air guiding duct 38, so that the filter module 40 can be fluidically connected to or detached from the duct outlet connection piece 50 of the air guiding duct 38 by a corresponding horizontal movement.

In the present exemplary embodiment, the separation device 42 is thus a separation filter constructed in modular fashion from the filter modules 40.

The booth air is diverted in the filter module 40 twice more by 90°, then flows through a filter unit 52, on which the paint overspray is deposited, and leaves the filter module 40 through a filter outlet connection piece 54 on the same side of the filter housing 46 on which the filter inlet 48 is situated. From there, the booth air, which is now largely freed from overspray particles, flows into an intermediate duct 56, via which it passes into a collecting flow duct 58.

The intermediate duct 56 has an inlet flange 60, the filter outlet connection piece 54 of the filter module 40 being able to be fluidically connected to or detached from this inlet flange 60 by the above-mentioned horizontal movement of this module. Thus, a filter module 40 is ready for operation in an operating position when its filter inlet 48 is connected to the duct outlet connection piece 50 of the air guiding duct 38 and its filter outlet connection piece 54 is connected to the inlet flange 60 of the intermediate duct 56.

The booth air is passed on, via the collecting flow duct 58, for further processing and conditioning and following that is conducted in a circuit (not shown specifically here) into the air supply space 14 again, from which it again flows from above into the painting tunnel 8. If the booth air is still not sufficiently freed from overspray particles by the separation filter 42, still further filter stages can be arranged downstream of the separation filter 42, to which stages the booth air is supplied and in which, for example, nonwoven filters or else electrostatically operating separation filters are employed, as known per se. Optionally, one or more of such further filter stages can also be integrated into the filter module 40. Thus, for example, a filter nonwoven can be arranged in front of the filter outlet connection piece 54.

One of the filter modules 40 is now explained in more detail with reference to FIG. 3. As can be seen therein, the filter housing 46 of the filter module 40 delimits as filter space a flow chamber 62 which extends between the filter inlet 48 and the filter outlet connection piece 54 and through which the booth air flows on a flow path curved by 180°.

Figure 2:
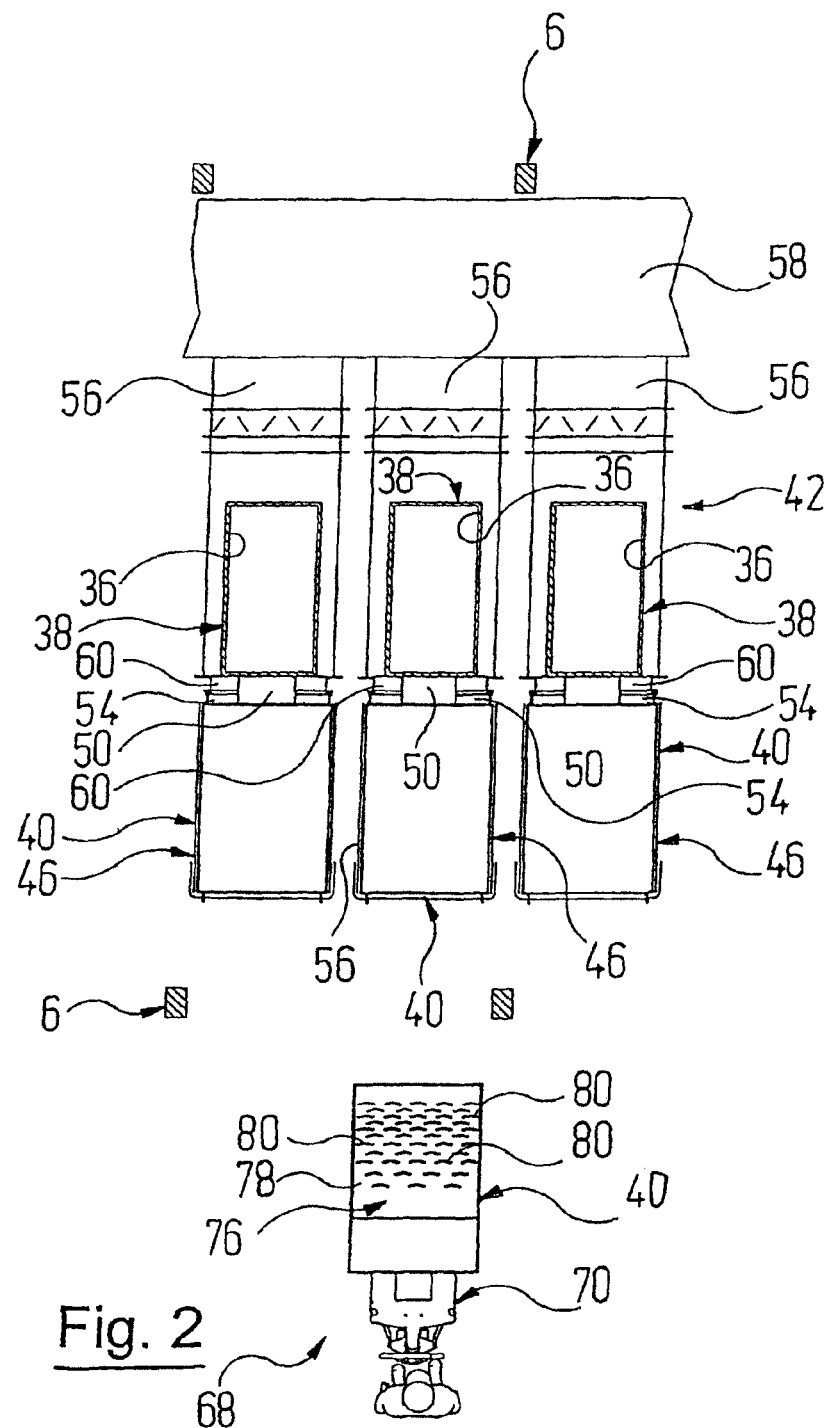
FIG. 2 shows a partial section of the painting booth of FIG. 1 along the section line II-II therein.

The filter housing 46 for its part comprises a bottom part 64 and a chamber cover 66, which is supported by the bottom part 64 and in which a chamber wall has the filter inlet 48 and the filter outlet connection piece 54. The bottom part 64 is formed in its geometry and its dimensions as a standardised supporting structure and, for example, in accordance with the specifications of a so-called Euro-pallet. In this way, a filter module 40 can be moved with a conveying system 68 adapted to such standard structures and brought into or removed from its operating position. This is indicated in FIGS. 1 and 2 with the example of a conveying lifting truck 70 manually operable by an operator.

The filter modules 40 can, accordingly, be arranged in the separation region 44 of the painting booth 2 in accordance with a grid based on the standardised bottom part 64 used.

At least one lower collecting region of the filter module 40 is formed liquid-tightly and thus as a collecting trough 72 for paint which is deposited on the filter unit 52 and flows off downwards therein.

The filter unit 52 is arranged in the filter space 62 in such a manner in front of the filter outlet connection piece 54 that the overspray-laden booth air flows through this unit in a horizontal main flow direction 74. The filter unit 52 comprises a supporting structure 76 with a largely horizontal supporting plate 78—as can be seen in FIG. 3, the supporting plate 78 here is inclined slightly downwards relative to the horizontal in the flow direction of the booth air entering the filter module 40—which plate is fastened on the inside of the housing wall of the filter housing 46 having the filter inlet 48 and the filter outlet connection piece 54.

The supporting plate 78 supports as separation elements a multiplicity of filter lamellae 80 which extend downwards in the direction of the collecting trough 72 and of which, for the sake of clarity, only a few are provided with a reference symbol. This can be effected, as in the present exemplary embodiment, for example in such a manner that the supporting plate 78 has slots 82 which are complementary to the filter lamellae 80 and in which the filter lamellae 80 are inserted. Only a few of the slots 82, too, bear a reference symbol.

The separation elements, i.e. in the present case the filter lamellae 80, are formed from a separation material permeable to the booth air. In the exemplary embodiment described here, the separation elements are formed as separation mats in the form of fibre mats 84 made of a fibre material, as known per se. In practice, a nonwoven material, such as is used, for example, in filters in the form of nonwoven mats available on the market, has proved successful.

Figure 3:
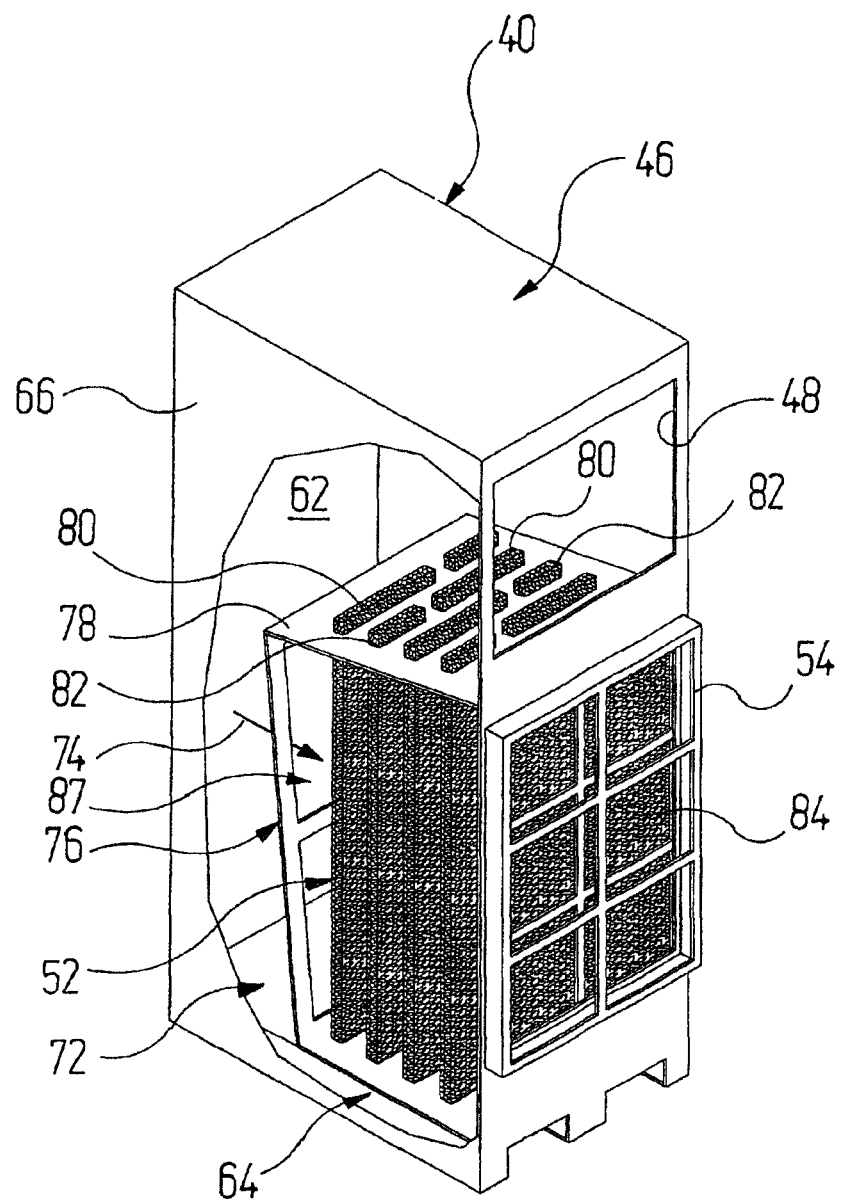
FIG. 3 shows a perspective view of a filter module of the separation device, a part of a filter housing being shown broken away.
Figure 4:
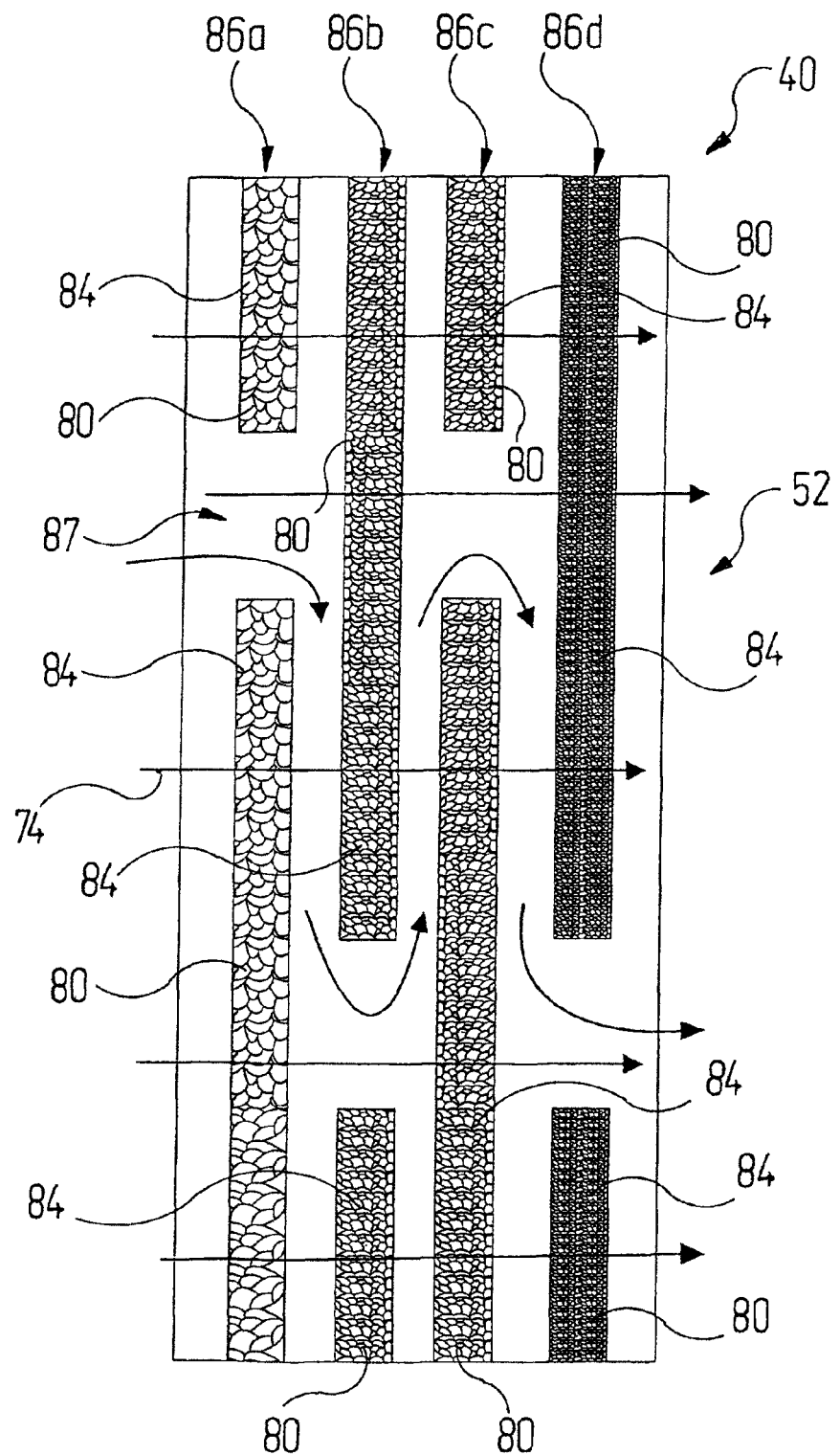
FIG. 4 shows a horizontal section of the filter module, which illustrates the arrangement and formation of several separation elements made of a nonwoven material.

In the exemplary embodiment shown in FIGS. 3 and 4, the fibre mats 84 are arranged transversely to the flow direction 74 of the air. In this case, the material density, i.e. the fibre density, of the fibre material used for the respective filter lamellae 80 in the fibre mats 84 increases in the flow direction 74. This is illustrated in FIG. 4 by a denser fibre structure in the individual fibre mats 84 which are arranged in the flow direction 74 in successive filter stages 86a to 86d. It is also possible to provide more or fewer than four filter stages.

A flow labyrinth 87, through which the booth air can flow, is formed in the filter unit 52. For this purpose, in the present exemplary embodiment, the individual filter lamellae 80 are spaced from one another in the flow direction 74 and in each filter stage 86a to 86d, and additionally offset with respect to one another.

The filter module 40 now functions as follows:

An unladen, fresh filter module 40 is taken first as the initial situation. If now overspray-laden booth air enters the filter unit 52, this booth air flows in the main flow direction 74 through the fibre mats 84, on which overspray is then deposited. Firstly, the majority of overspray is deposited on the fibre mats 84 in the first filter stage 86a, these being the first through which the booth air flows and having the lowest material density.

In the course of time, the fibre mats 84 in the individual filter stages 86a, 86b, 86c and 86d gradually absorb so much overspray that they become impermeable to the booth air. Generally, the fibre mats 84 in the first filter stage 86a became clogged first and then successively the fibre mats 84 in the second, third and fourth filter stage 86b, 86c and 86d. The booth air then initially no longer passes through the respective fibre mats 84 in the first filter stage 86a, but flows through the interspace between the fibre mats 84 of the first filter stage 86a into the flow labyrinth 87. Optionally, the filter mats 84 of the fourth filter stage 86d may also become clogged first, followed by the filter mats 84 of the third, second and first filter stage 86c, 86b and 86a. This depends on the material density of the individual filter mats 84.

When the overspray-laden booth air strikes an impermeable fibre mat 84, the booth air is diverted by this fibre mat 84 and can flow on through the next passage between two fibre mats 84 of a filter stage 86a, 86b, 86c or 86d. This is illustrated in FIG. 4 by the curved arrows.

When, therefore, fibre mats 84 of a filter stage 86a, 86b, 86c or 86d have become impermeable to the booth air, the filter module 40 thus operates in the manner of an inertial filter, in which the overspray particles are deposited in a manner known per se according to the principle of mass inertia on the no longer permeable filter lamellae 80 when the flowing booth air undergoes a change of direction. Optionally, means such as e.g. slides may be present, by which the passage through the flow labyrinth 87 can be blocked, so that the filter module 40 can operate over a certain period of time as a pure nonwoven filter.

The overspray flows downwards from the fibre mats 84 into the collecting trough 72, where the overspray accumulates into a paint sludge.

As can be seen in FIG. 1, the filter module 40 rests in its operating position on scales 88 and is locked in its operating position by means of a locking device 90 at the top and bottom.

Each filter module 40 is designed for the absorption of a maximum amount of paint, i.e. for a limit loading with overspray, which depends on the design of the filter module 40 and the materials used therefor. The amount of paint already absorbed can be monitored via the scales 88. Alternatively, the limit loading can be ascertained by means of a differential pressure determination. The greater the loading of the filter module 40, the greater is the air resistance built up by the filter module 40.

When a filter module 40 reaches its maximum absorption capacity, the locking device 90 is released, the fully laden filter module 40 is removed from the separation region 44 of the painting booth 2 using the lifting conveyor 70 and exchanged for an empty filter module 40. For this purpose, the flow connection of the filter module 40 to be exchanged to the guiding duct 38 and the connecting duct 56 is interrupted beforehand, by closing the duct outlet connection piece 50 of the guiding duct 38 and the inlet flange 60 of the connecting duct 56 by means of shut-off slides (not shown specifically).

When the empty filter module 40 has been moved into its operating position on the scales 88, it is accordingly locked with the locking device 90 and thus secured against unintended removal from the separation region 44. The shut-off slides of the guiding duct 38 and of the connecting duct 56 are brought into an open position again, so that the booth air flows through the newly positioned filter module 40.

Figure 5A:
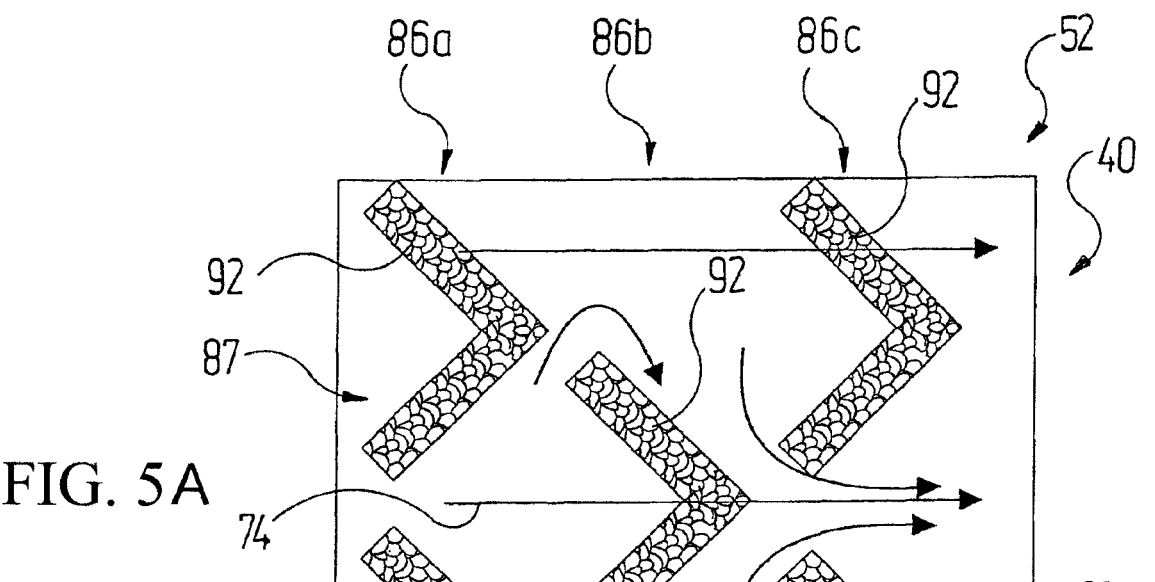
FIGS. 5A and 5B show the horizontal section corresponding to FIG. 4, in which modified separation elements are present.
Figure 5B:
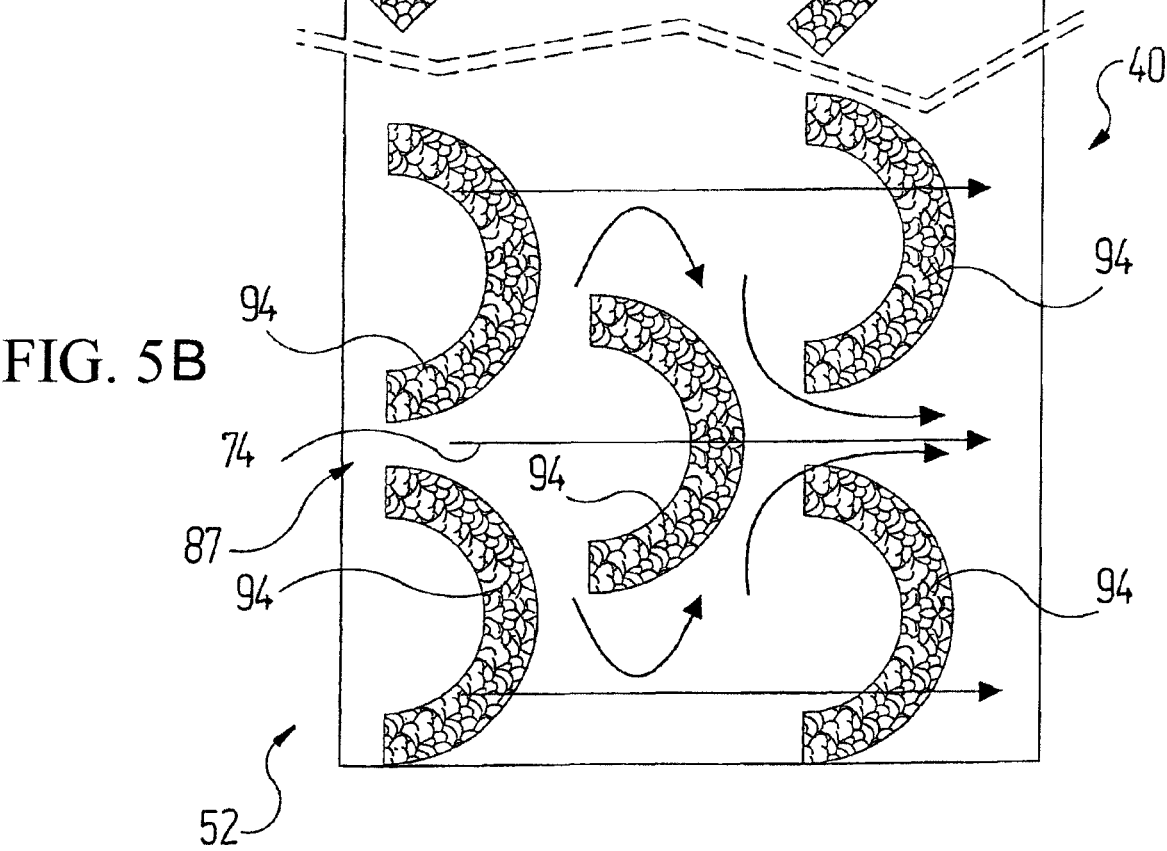

Instead of the fibre mats 84, it is also possible to use separation elements formed differently in their geometry and dimension. FIGS. 5A and 5B show in each case a modified filter module 40. In FIG. 5A filter lamellae 92 of v-shaped cross-section are shown, while in FIG. 5B filter lamellae 94 of arcuate cross-section can be seen.

Instead of the filter lamellae 80, 92 or 94, compartmented structures or chambered structures may also be provided as separation elements. For example, lamellae or plates connected to one another in a foldable or pluggable manner may be used as compartmented structures. In practice, chambered structures are constructed in a honeycomb manner.

With regard to the processing or disposal of the filter module 40, one component, a plurality of components or all the components of the filter module 40 can be produced from a wet-strength recyclable material.

Examples of possible wet-strength recyclable materials are paper materials and paperboard materials, corrugated board, boards with vertical flutes, boards with honeycomb structure or wet machine boards, MDF material or wood. Plastics such as, in particular, polyethylene or polypropylene are also suitable.

The filter module 40 may, furthermore, by formed as such as a modular kit. In this case, a filter module can be constructed in situ and transported to the place of its use in a space-saving manner, e.g. folded up.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. A plant for coating articles comprising:
    a) a coating booth, in which coating material is applied to articles and through which an air flow is conducted which takes up and carries off resulting overspray of the coating material;
    b) a separation device, to which booth air is supplied and where a large part of at least solids is separated from the overspray, the separation device having at least one filter module through which overspray-laden booth air is conducted and in which overspray is deposited; wherein
    c) the at least one filter module comprises a housing which delimits a filter space through which the overspray-laden booth air is conducted in a main flow direction, further wherein
    d) a multiplicity of separation elements composed of a separation material which is permeable to the booth air are arranged in the housing and the filter space such that each separation element is spaced apart from any adjacent separation elements such that spaces are formed between adjacent separation elements and a flow labyrinth is formed in the spaces existing between each of the multiplicity of separation elements;
    e) the separation material is a fibre material; and
    f) a material density of each of the separation elements in filter stages increases in the main flow direction.

2. The plant according to claim 1, wherein filter lamellae, filter sleeves, compartmented structures or chambered structures are present as separation elements within the multiplicity of separation elements.

3. The plant according to claim 2, wherein the separation elements are formed as filter lamellae in the form of separation mats.

4. The plant according to claim 2, wherein the separation elements are formed as filter lamellae with a V-shaped or arcuate cross-section.

5. The plant according to claim 1, wherein the separation material is a nonwoven material.

6. The plant according to claim 1, wherein the multiplicity of separation elements are arranged in filter stages which follow one another in the main flow direction.

* * * * *